June 27, 1961     A. POGGIOLI ET AL     2,990,288
PROCESS FOR THE PREPARATION OF STERILE MILK
Filed Aug. 13, 1959
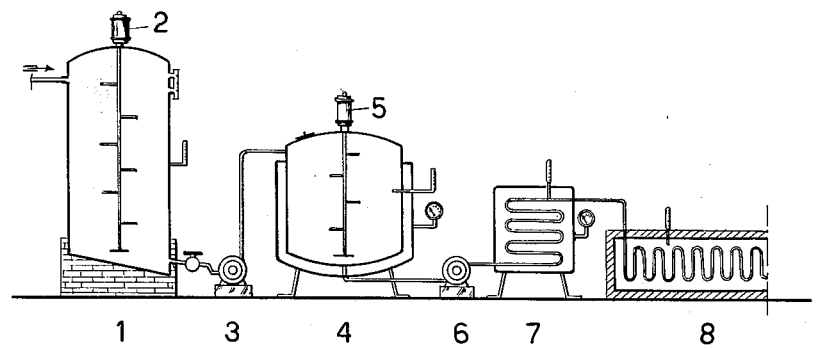
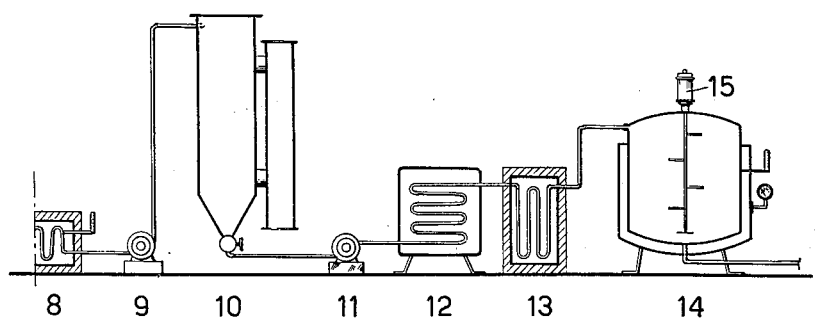
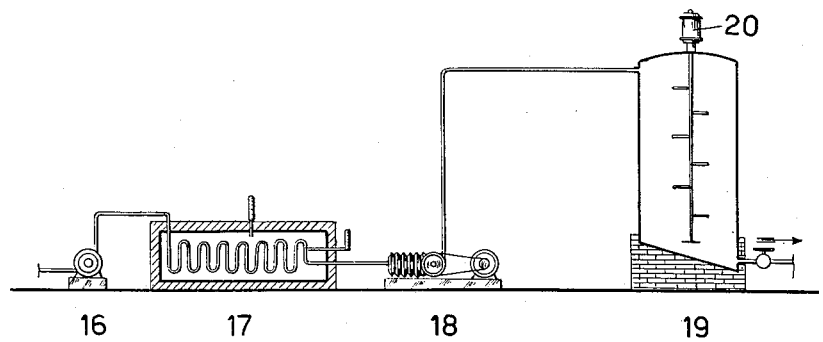
INVENTORS:
A. Poggioli and O. Di Gaeta
BY
Richards & Geier
ATTORNEYS United States Patent Office 2,990,288
Patented June 27, 1961

2,990,288
PROCESS FOR THE PREPARATION OF STERILE MILK
Aliero Poggioli and Ottavio Di Gaeta, both of
Via G. Papio 20, Salerno, Italy
Filed Aug. 13, 1959, Ser. No. 833,434
Claims priority, application Italy July 22, 1959
3 Claims. (Cl. 99—212)

Over the last few years the production of "sterile milk" has become common use in most of the more advanced countries. The dairy industry has been turning to this process because the distribution of milk to the public through the "Milk Distribution Stations" has only partially guaranteed, through the pasteurisation process, the perfect edibility and the absence of pathogenic germs.

On the other hand, since milk as a food ranks very high in the scale of dietary values, because of its nutrient properties and of its universal use, it can be said that nowadays there is no country where milk does not form an object of marketing, both local and import. This is evidenced by the high rates of consumption reached over the last few years, which have principally made it necessary to ensure not only a continuous improvement in the edibility of milk, but also the conditions for an increasingly high degree of preservation.

Another need is for a solution to the old problem of placing on the market milk as free as possible from the germs of cattle tuberculosis, unfortunately so common, and from the whole range of cocci and streptococci which thrive on the udders of cows, and which are practically impossible to eliminate in the process of milking, even if done with modern and efficient facilities.

These considerations have led some dairy industry to engage in the production of "sterile milk."

From a general standpoint, the problem of sterilization may appear rather simple. In practice, instead, it is found that the known methods of sterilization bring about very substantial changes in the basic structure of the organic substances, that is a chemico-physical transformation involving the destruction of many components and alterations in flavor, odor and color.

As far as milk is concerned, sterilization presents so many difficulties that to this date the problem of obtaining a product of acceptable quality has not yet been solved.

The process according to this invention makes it possible to prepare a "sterile milk" which has successfully passed laboratory tests, not only as regards sterility but also with respect to quality. This process yields milk free from the Koch bacillus and from other pathogenic germs, while retaining all natural characteristics of fresh milk, as regards both composition and organoleptic characters.

The process according to the present invention is described below with special reference to the preparation of whole milk, it being understood that all derivates can be prepared in the same process or a similar one, by introducing in the processing cycle the changes required to obtain the various types of milk.

The process will be more clearly understood by reference to the attached drawing which represents, for purposes of exemplification, the arrangement of a plant showing the processing cycle and the necessary equipment, the latter being, however, susceptible of modifications.

(A) The cycle of operations to obtain sterile milk in bottles or cans in the concentrated state is the following:

(1) Selection and collection of fresh milk, with organoleptic characters meeting the specifications set forth in the health laws;
(2) Collection and storage of the raw milk;
(3) Pre-heating of the raw milk;
(4) Superheating of the pre-heated milk;
(5) Cooling of the superheated milk;
(6) Concentration under high vacuum, in a thin layer;
(7) Super-heating of the concentrate;
(8) Cooling of the concentrate;
(9) Hot-curing of the concentrate;
(10) Cooling of the cured milk;
(11) Homogenization;
(12) Collection and storage of the sterile milk;
(13) Bottling or canning in pre-sterilized containers.

(B) To obtain bottled sterile milk in the natural liquid state, the same phases of Process A above are followed, eliminating the phase of concentration in a thin layer under high vacuum, and bottling or canning the sterile milk in pre-sterilized containers.

(C) To obtain sterile milk powdered by cold sublimation under high vacuum, the following operations are carried out:

(1) Same phases as for processing sterile milk in the condensed state;
(2) Freezing of the sterile concentrate;
(3) Cold-sublimation of the sterile concentrate thus obtained, under a very high vacuum (according to a process which forms the object of the copending U.S. patent application Serial No. 745,264).

(A) With reference to the diagram illustrated in the drawing, the plant for the preparation of the bottled or canned sterile milk in the concentrated state has the following characteristics:

All parts and components in contact with milk must be built of special nickel-chrome-molybdenum steel and be easy to dismantle, wash and sterilize with strong jets of superheated steam.

The fresh raw milk is collected in a double-walled tank 1 and is kept there under slow agitation by means of a motor 2, at the temperature of 41° to 44°. This temperature remains almost constant, because water slightly above the freezing point is circulated in the double wall of the tank. When in the storage tank the quantity of milk required for starting the sterilization process has been collected, the milk, by means of a suitable pump 3, is sent into a pre-heating autoclave 4 and there maintained under slow agitation by motor 5, at the temperature of 194°–198° F. for 40 minutes. The pre-heating autoclave will be fitted with a steam jacket for the purpose of maintaining the interior at the said temperature.

On completion of the pre-heating phase, by means of another pump 6 the milk is sent to the first tubular sterilizing autoclave 7, where it is superheated for 4 to 5 seconds at the temperature of 268° to 275° F. Autoclave 7 contains a coil through which milk passes in the time indicated above. The autoclave chamber must be designed to ensure that steam enters at a pressure resulting in the superheating of the milk in the coil at the said temperature. From this autoclave, again by means of pump 6, the milk is sent to a cooling coil 8 immersed in a tank containing cold water, in which coil the milk temperature is reduced to 95°–104° F.

By means of another pump 9, the milk thus cooled is sent into plant 10 for thin-layer concentration under high vacuum, in which it is concentrated at a ratio of not less than 1:2 and not more than 1:3.

The milk concentration temperature must not exceed 95° to 104° F. This is achieved by using a high-vacuum thin-layer concentration plant of the type now commonly used. By means of another pump 11, the concentrated milk is sent to a sterilizing autoclave 12 identical to that described above, there to be again superheated for 4 to 5 seconds to 268°–275° F.

By means of the same pump 11, the concentrate which has thus undergone a new stabilization phase, is sent into the coil of cooling tank 13 where its temperature is reduced to 194° F., the size of the tank containing cold water in circulation and of the coil being such that the temperature can be reduced to the indicated value.

From the cooling tank 13, the milk at 194° F. is sent to an autoclave 14, wholly similar to the pre-heating autoclave, in which, slowly stirred by motor 15, it is cured for 10 minutes, at the temperature of 194° F.

On completion of the curing process the milk, by means of pump 16, is made to pass through the coil immersed in another cooling tank 17, identical to that described above, in which it is further cooled to 68°–77° F.

From the said cooling coil, the milk is sent to the homogenizing plant 18, which is identical to the currently used homogenizing plants.

The homogenized milk is then sent into a storage tank 19, identical to the storage tank described above, where it is kept under slow stirring by motor 20 at the temperature of 41° to 44° F.

The sterile milk thus obtained can then be sent to the bottling or canning plant, where it is packed into previously sterilized containers.

It should be noted that the bottling plant should be designed to prevent dripping from the filling taps and the system for sealing the containers must be incorporated in the bottling plant in order that the containers may be sealed with the least delay.

It is understood that the processing cycle described above is continuous, designed for the processing of large quantities of milk, the size of the plant outlined here being variable in accordance with the output to be obtained.

(B) The process for the production of bottled or canned sterile milk in the liquid state is the same described for concentrated sterile milk, omitting only the phase of thin-layer high-vacuum concentration performed in the unit shown as 10 in the drawing.

(C) The initial phases of the process for producing powdered sterile milk by cold sublimation under a very high vacuum are entirely similar to those described for the concentrated sterile milk, up to the storage tank 13 described in paragraph A above.

Thence the mass of the sterile concentrate is transferred to pre-sterilized containers of suitable shape, size and wall insulation, and introduced into a refrigerated cell, where it is brought to a temperature of −22° to −49° F. This treatment is followed by the process of sublimation under a very high vacuum, which removes all the water still contained in the product. For this treatment the product is sent into the sublimation plant, where a high vacuum is established, in the order of .1 to .001 mm. of Hg. At the end of this process the product will be at an average temperature of 77° F. and a residual moisture of .5 to not more than 4%, as described in the copending U.S. patent application mentioned above.

The sublimate containers are then carefully sealed under vacuum.

Under these conditions the sterile milk keeps almost indefinitely, and tests conducted with three year old samples have shown that by adding water to the ratio present in fresh milk products, a milk is obtained which is perfectly similar to natural milk in all natural and organoleptic characters, as well as in taste, odor, color and nutrient values.

What we claim is:

1. The process of preparing concentrated bottled and canned sterile milk, which comprises, in the following sequence, the steps of preheating fresh milk for about 40 minutes to a temperature of between 194° F. and 198° F., superheating it to a temperature of between 268° F. and 275° F. for a period of 4 to 5 seconds, cooling it to a temperature of between 95° F. and 104° F., concentrating it to a ratio of from 1:2 to 1:3 at a temperature ranging between 95° F. and 104° F., superheating it to a temperature ranging between 268° F. and 275° F. for a period of 4 to 5 seconds, cooling it to a temperature of substantially 194° F., curing it for about 10 minutes at the temperature of 194° F., cooling it to a temperature ranging between 68° F. and 77° F., homogenizing it and collecting the sterile concentrate at a temperature ranging between 41° F. and 44° F.

2. The process of preparing liquid bottled and canned sterile milk, which comprises, in the following sequence, the steps of preheating fresh milk for about 40 minutes to a temperature of between 194° F. and 198° F., superheating it to a temperature of between 268° F. and 275° F. for a period of 4 to 5 seconds, cooling it to a temperature of between 95° F. and 104° F., superheating it to a temperature ranging between 268° F. and 275° F. for a period of 4 to 5 seconds, cooling it to a temperature of substantially 194° F., curing it for about 10 minutes at the temperature of 194° F., cooling it to a temperature ranging between 68° F. and 77° F., homogenizing it and collecting the sterile concentrate at a temperature ranging between 41° F. to 44° F.

3. The process of preparing powdered sterile milk, which comprises in the following sequence, the steps of preheating fresh milk for about 40 minutes to a temperature of between 194° F. and 198° F., superheating it to a temperature of between 268° F. and 275° F. for a period of 4 to 5 seconds, cooling it to a temperature of between 95° F. and 104° F., concentrating it to a ratio of from 1:2 to 1:3 at a temperature ranging between 95° F. and 104° F., superheating it to a temperature ranging between 268° F. and 275° F. for a period of 4 to 5 seconds, cooling it to a temperature of substantially 194° F., curing it for about 10 minutes at the temperature of 194° F., cooling it to a temperature ranging between 68° F. and 77° F., homogenizing it, collecting the sterile concentrate at a temperature ranging between 41° F. and 44° F., freezing the concentrate at a temperature ranging between −22° F. and −49° F., sublimating the frozen concentrate under high vacuum, collecting the sublimate in containers and hermetically sealing said containers under vacuum.

References Cited in the file of this patent

UNITED STATES PATENTS

| | | |
|---|---|---|
| 2,559,205 | Wenzelberger | July 3, 1957 |
| 2,822,277 | Ellertson et al. | Feb. 4, 1958 |
| 2,827,381 | Boyd | Mar. 18, 1958 |
| 2,860,057 | Wilcox | Nov. 11, 1958 |
| 2,885,788 | Leviton | Mar. 12, 1959 |

OTHER REFERENCES

"Food Packer," November 1949, pp. 63, 64 and 67.
"Food Industries," January 1945, pp. 92–95, 168, 170, 172, 174, 176, 178.